(12) United States Patent
Broderick (10) Patent No.: US 10,426,186 B2
(45) Date of Patent: Oct. 1, 2019

(54) CENTRIFUGAL PRODUCT PEEL SEPARATION AND REMOVAL APPARATUS

(71) Applicant: TOMRA SORTING SOLUTIONS, Dublin (IE)

(72) Inventor: Michael Broderick, Co. Carlow (IE)

(73) Assignee: TOMRA SORTING SOLUTIONS, Dublin (IE)

(*) Notice: Subject to any disclaimer, the term of this patent is extended or adjusted under 35 U.S.C. 154(b) by 199 days.

(21) Appl. No.: 14/388,415

(22) PCT Filed: Mar. 28, 2013

(86) PCT No.: PCT/EP2013/056806
§ 371 (c)(1),
(2) Date: Sep. 26, 2014

(87) PCT Pub. No.: WO2013/144336
PCT Pub. Date: Oct. 3, 2013

(65) Prior Publication Data
US 2015/0082999 A1   Mar. 26, 2015

(30) Foreign Application Priority Data
Mar. 28, 2012 (IE) .................. S2012/0158

(51) Int. Cl.
*B02B 3/08* (2006.01)
*B02B 3/00* (2006.01)
(Continued)

(52) U.S. Cl.
CPC ............. *A23N 7/00* (2013.01); *A23N 7/02* (2013.01); *B02B 3/08* (2013.01); *B02B 3/10* (2013.01); *B02B 3/00* (2013.01)

(58) Field of Classification Search
CPC .... B02B 3/00; B02B 3/04; B02B 3/08; B02B 3/10
(Continued)

(56) References Cited

U.S. PATENT DOCUMENTS 207,307 A * 8/1878 Schaschue ................ B02B 3/04
99/522
290,288 A * 12/1883 Todd ........................ B02B 3/00
99/524
(Continued)

FOREIGN PATENT DOCUMENTS

DE            469410 C       12/1928
EP        0133593 A1         2/1985
(Continued)

OTHER PUBLICATIONS

International Search Report dated Jul. 12, 2013 issued in International Application No. PCT/EP2013/056806.
(Continued)

*Primary Examiner* — Reginald Alexander
(74) *Attorney, Agent, or Firm* — Rossi, Kimms & McDowell LLP (57) ABSTRACT

An agitator for a product peel removal system, the agitator comprising: a central axle having a plurality of outwardly projecting arms; and a product lifter at the distal end of at least one of said outwardly projecting arms; and an apparatus for product peel removal comprising: a drum having an inlet for receiving product, an outlet for dispensing of product; and a plurality of perforations through which removed peel may pass; at least one agitator arranged within said drum and rotatable relative to said drum for agitating the product passing between said inlet and outlet; and means
(Continued)

for controlling the retention time of product within the rotatable drum independently from the rotation speed of the agitator.

29 Claims, 13 Drawing Sheets

(51) Int. Cl.
    *A23N 7/00*     (2006.01)
    *B02B 3/10*     (2006.01)
    *A23N 7/02*     (2006.01)

(58) Field of Classification Search
    USPC ......... 99/522, 603, 605, 607, 608, 617, 627,
                   99/630; 366/309, 311, 312, 224, 221
    See application file for complete search history.

(56) References Cited

U.S. PATENT DOCUMENTS

| | | | | |
|---|---|---|---|---|
| 291,362 A * | 1/1884 | Lane | ........................ | B02B 3/045 99/529 |
| 297,782 A * | 4/1884 | Gathmann | ................ | B02B 3/00 99/603 |
| 313,712 A * | 3/1885 | Dawson | .................... | B02B 3/00 99/603 |
| 426,910 A * | 4/1890 | Brookmire | ................ | B02B 3/04 144/208.9 |
| 638,363 A * | 12/1899 | Sharples | ........................ | 366/221 |
| 649,543 A * | 5/1900 | Larmon | .................... | B02B 3/00 241/74 |
| 1,215,526 A * | 2/1917 | Hansen | ................ | B01F 7/00208 196/122 |
| 1,292,141 A * | 1/1919 | Swigert | ............... | B01F 7/00208 366/246 |
| 2,358,827 A * | 9/1944 | Rakowsky | ................ | B02B 1/04 241/10 |
| 2,910,070 A * | 10/1959 | Greedy | .................. | A23N 15/10 460/142 |
| 3,145,017 A * | 8/1964 | Thomas | .................... | A23G 9/16 366/310 |
| 4,095,517 A * | 6/1978 | Janovtchik | ............... | A23N 1/00 99/495 |
| 7,493,852 B2 * | 2/2009 | Taylor | .................... | A23N 15/10 426/482 |

FOREIGN PATENT DOCUMENTS

| | | |
|---|---|---|
| FR | 2547168 A1 | 12/1984 |
| GB | 556659 A | 10/1943 |
| GB | 2063653 A | 6/1981 |
| SU | 511064 A | 9/1977 |

OTHER PUBLICATIONS

Written Opinion dated Jul. 12, 2013 issued in International Application No. PCT/EP2013/056806.

\* cited by examiner

CENTRIFUGAL PRODUCT PEEL SEPARATION AND REMOVAL APPARATUS

FIELD OF THE INVENTION

The invention relates to product processing, in particular the processing of fruit and vegetable products. In particular, the invention relates to an improvement in dry peel removal.

BACKGROUND TO THE INVENTION

The centrifugal effect gained by rotating articles within a container has been found to be useful in dry removal (i.e. no water used) of skin from skinned produce. Centrifugal separators comprising a rotating perforated drum have been utilised within produce processing systems to remove starch and loosened peel after steam peeling from produce fed through the drum. The centrifugal action of the rotating drum separates loosened peel from the product and carries or forces it through the perforations in the drum wall. An internal auger may be mounted within the drum to control the retention time of the product within the drum. An auger may also induce extra product mobility into the drum. The rolling and rubbing of product against the drum wall while passing through the drum loosens peel prior to removal through the perforations.

During the process of peel separation, considerable amounts of starch or other product residue can attach to and build up upon the inside of a drum. This residual material can subsequently be transferred back to the product which can considerably reduce the efficiency of the unit. The build-up may also partially block the perforations in the drum and thus prevent passing of peel out through the perforations.

One such prior art centrifugal separator comprises a central auger on which are provided lifters. The lifters agitate the product as the auger controls the residence time of the product in the drum. A result of the lifter being attached to the auger is that the amount of agitation is limited to the speed of the auger. For example, an auger speed of 20 R.P.M. will give a maximum of 20 lifts/tumblings of the product per minute, where one lifter is provided per flight of the auger.

The speed of the auger in such a prior art system is limited by the minimum required retention time of product to achieve the required peel/starch removal.

Existing equipment typically achieves only 80-85% removal of peel and starch. Thus what is required is a centrifugal separator with improved efficiency of starch and peel separation. It is desired to remove 90-95% of peel and starch from product.

SUMMARY OF THE INVENTION

According to the present invention there is provided an apparatus for product peel removal/separation comprising a drum having an inlet for receiving product, an outlet for dispensing of product; and a plurality of perforations through which removed peel may pass, at least one agitator arranged within said drum and rotatable relative to said drum for agitating the product passing between said inlet and outlet to encourage product-to-drum rubbing primarily but also product-to-product rubbing, and means for controlling the retention time of product within the rotatable drum independently from the rotation speed of the agitator.

The apparatus acts as centrifugal deskinner/separator/scrubber. The agitator is formed and arranged so as not to impart substantial movement of product in the axial direction of the drum, unlike prior art agitators in centrifugal deskinners wherein the agitator is integrated with an auger arranged to move product through the drum.

The centrifugal deskinner of the present invention does not require an internal auger. Residence time of product within the drum is controlled by other means. The drum is provided with a stand-alone dedicated agitator/lifter which can be run at any speed. As the residence time is independent from the speed of rotation of the agitator, the agitator may be run at far higher speeds than the prior art systems were able to achieve. According to one embodiment, the agitator may be rotated at a speed of up to approximately 40 R.P.M., whereas prior art speeds are typically in the range of 20-25 R.P.M. The speed may be variable.

The drum is preferably rotatable. The at least one agitator may be rotatable independently from said drum. Preferably the drum and agitator rotate in the same direction, however counter-rotation is also possible. In accordance with the present invention, an increase in rotation speed of the agitator may not result in a decrease in the retention time of the product with the drum.

The apparatus of any preceding claim wherein said at least one agitator comprises a central axle having at least one outwardly projecting arm. The agitator may comprise a plurality of outwardly projecting arms. At least two of said arms may be linked by a bridging member. The bridging member and arms may form a hollow frame about said central axle. Means may be provided for rotating said at least one agitator. Preferably said means for rotating said at least one agitator is controllable independently from any means for rotating said drum. It is advantageous for the drum to rotate faster than the actuator. Control means to control the speed of rotation of at least the drum and or control means to control the speed of the agitator may be provided.

Preferably at least one lifter is provided at the distal end of each outwardly projecting arm. At least one lifter may be pivotally mounted on its outwardly projecting arm. The or each pivotally mounted lifter may comprises a scraper adapted to contact an internal wall of the drum. The scraper is preferably located on a leading edge of the lifter. The scraper may be integral to the lifter or attached thereto or mounted thereon. A clamping plate may be used to mount the scraper to the lifter. The scraper may extend the whole or part of the length of the lifter. The scraper is preferable of a length so that it projects beyond the lifter to contact the internal surface of the drum. It may be replaceable.

The pivotally mounted lifter may be arranged so that, in use, the scraper is biased against the internal wall of the lifter under the weight of product being lifted. As the lifter and scraper rotate relative to the drum, the produce hold the scraper in close contact with the drum to urge any removed peel or starch stuck to the drum wall out through the perforations.

The claimed invention achieves an increase in performance by improving the efficiency of agitation of the product inside the drum. The present invention should achieve removal of 90-95% of peel and starch in use. The higher efficiency results from higher rotation speeds and increased agitation of the produce by the agitators. The efficiency may be improved further by increasing the number of agitators within the drum. For example, three agitators or lifters would result in a three-fold increase in the separation effect.

Preferably there is also provided means for removing/detaching starch or peel that becomes attached to the internal wall of the drum. This feature reduces the likelihood of removed peel/skin becoming re-attached to the product. Starch can act like a glue to bond removed peel or skin to a previously peeled product.

In one embodiment, a scraper or brush may be provided and arranged to make contact with the interior wall of the drum and scrape or brush starch or other residue therefrom. The scraper may be static or moveable longitudinally to scrape the drum section by section. Means may be provided to transport removed peel/starch from the drum. A debris removal conduit having an outlet external to said drum for removal of debris separated from the interior wall of said drum by said brush may be provided. A auger may be provided within the conduit to assist removal. A spray may also be provided within the drum to spray liquid onto the interior wall of the drum to facilitate removal of build-up on the drum.

In a preferred embodiment the perforations themselves are utilised to dispose of removed peel that builds up on the internal wall of the drum. To assist with the passage/propulsion of the build up from the internal wall of the drum to the outside, additional propulsion means may be provided. These means may take the form of a scraper or similar which is arranged to bear against the perforated wall of the drum. The rotation of the drum itself may be used to drive the propulsion means, alone or in combination with the counter-rotation of the actuator(s). The means for pushing are preferably located at the end of at least one outwardly projecting arm of the agitator.

The propulsion means will act to push/force/urge any starch or residual product that is attached to the drum out through the drum's perforations, thereby increasing the effect of the centrifugal force.

The drum is intended for use with root vegetables, but could be used with any product. The suitability of the drum would only be limited by the size of the slots in the wall of the drum that could not be larger in size than the product to be processed. The size of the slots may be dictated by the size of the product—for example baby carrots would require smaller slots/perforations than potatoes.

The drum may be tilted to encourage travel of product through the drum. A gate may be provided at the exit point of the drum, which may be used to control residence time. It may be possible to vary the position of the gate provided at the discharge of the drum to control the bed depth of product within the drum, together with the product retention time.

A partial ribbon auger may be provided to induce movement through the drum. The partial ribbon auger may have a small helix angle. Desirably the ribbon auger is located near the entry point of the drum and function to keep the inlet/in feed clear by encouraging movement away.

At least one product retarding plate may be provided to interrupt the progression of the product through the drum. Multiple plates may be provided along the length of the agitator. Preferably, each plate extends between a pair of lifters. Preferably each plate is in a plane substantially perpendicular to the longitudinal axis of the drum. Preferably plates on adjacent arms are arranged to rotate out of synch with each other.

Alternate residence time control means may further be provided. Through use of independent agitation means and independent residence time control means, increased agitation is possible without effecting residence time.

The present invention permits the control of speed of the agitator independently from the product retention time within the drum. Preferably the means for rotating the or each agitator is controllable independently from any means for rotating said drum.

One or more inspection door may be provided in the drum to facilitate service/maintenance of the machine. Hinges may be provided to enable the door(s) pivot between an open and closed position. Locking means are suitably provided to maintain the door(s) in a closed position while the machine is in use. The door(s) are suitably provided with slots so as to form functioning parts of the wall of the drum when closed.

The invention further provides an agitator for a product peel removal system, the agitator comprising: a central axle having a plurality of outwardly projecting arms; and a product lifter at the distal end of at least one of said outwardly projecting arms.

The agitator may comprise at least one set of at least three outwardly projecting arms. The agitator may comprise multiple sets of at least three outwardly projecting arms: and at least three lifters, each lifter linking an arm from each set.

Each product lifter may be positioned substantially parallel to the central axle. Each arm may extend substantially perpendicularly from the central axle. Preferably at least one lifter is pivotally mounted on its outwardly projecting arms. At least one scraper may be mounted on at least one lifter. Preferably the scraper is located on a leading edge of the lifter.

The invention further provides a centrifugal separator comprising an agitator as described above, an apparatus substantially as described herein with reference to and as shown in any one or more of the accompanying drawings, a centrifugal separator substantially as described herein with reference to and as shown in any one or more of the accompanying drawings, and an agitator substantially as described herein with reference to and as shown in any one or more of the accompanying drawings.

BRIEF DESCRIPTION OF THE DRAWINGS

Embodiments of the invention will be described, by way of example only, with reference to the accompanying drawings in which.

DETAILED DESCRIPTION OF THE DRAWINGS

Figure 1:
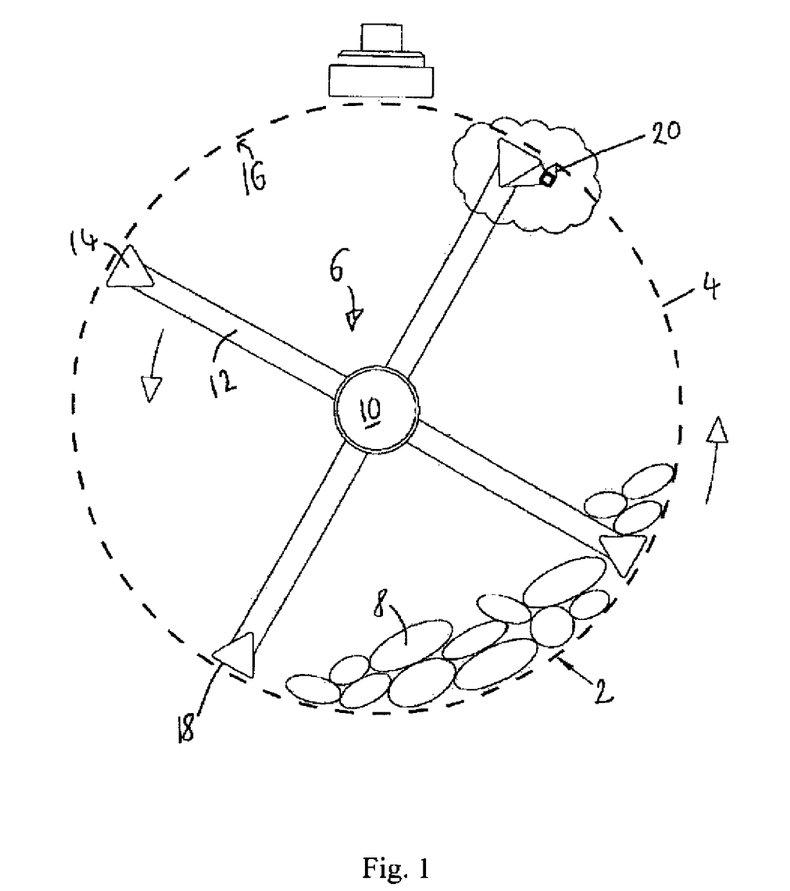
FIG. 1 is an end-on cross section view of one embodiment of an apparatus according to the present invention.

FIG. 1 shows one embodiment of the apparatus for product peel removal of the present invention. The perforated drum 2 is indicated by the broken line, the drum comprising a plurality of perforations 4 through which removed peel may pass. The drum comprises one agitator 6 rotatable relative to the drum for agitating product 8 within the drum to encourage product-to-product rubbing and to ensure that all products make as much contact as possible with the drum surface. As shown by the arrow, the drum is also rotatable. Preferably speed of rotation of the drum is between around 40 to 100 RPM. The agitator is rotatable independently from the drum.

As seen, the agitator in this embodiment of the invention comprises a central axle 10 with multiple outwardly projecting arms 12. The arms project from multiple locations along the length of the central axle. In this embodiment, four agitator arms project from the central axle at each projection point along its length. 90 degrees separate each arm's angle of projection. Lifters 14 act as bridging members to link the arms along the length of the central axle. The lifters run parallel to the central axle and are located a short distance from the inner wall 16 of the drum. Four lifters are shown in this embodiment however more or less are possible in alternative embodiments. Any reasonable number of lifters may be provided, including just one. In the embodiment shown each lifter has a triangular cross section, with one edge 18 of the lifter positioned substantially parallel to the inner wall of the drum, however other shapes of lifter are envisaged. The lifters and arms form a hollow frame about said central axle through which product can tumble.

A scraper 20 is shown attached to one of the lifters to push peel and other residue through the perforations as the lifter is displaced relative to the drum wall. Alternative forms and locations of the scraper are envisaged in alternative embodiments as described below in greater detail.

Figure 2:
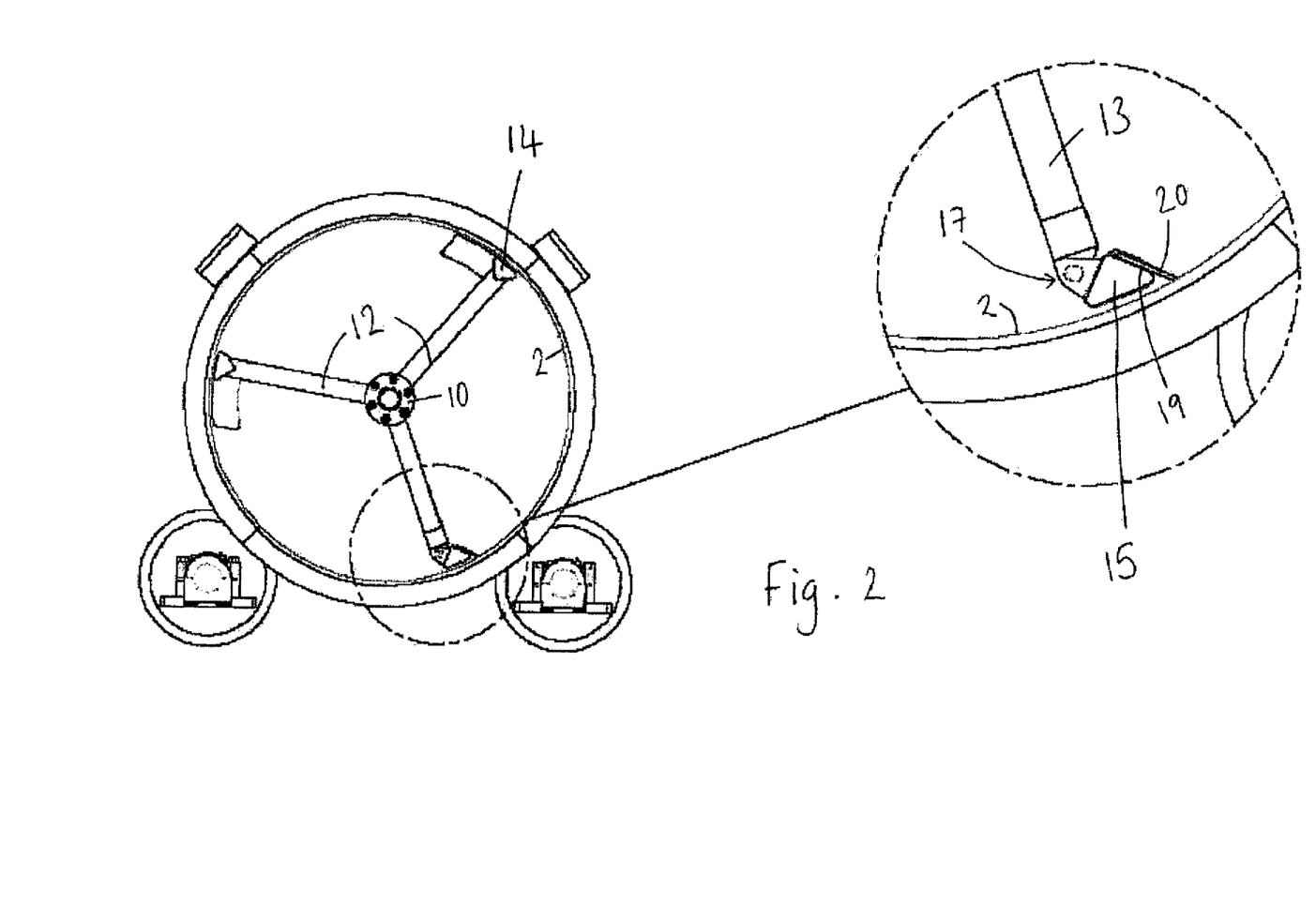
FIG. 2 is a cross section view of a further embodiment of an apparatus according to the present invention.
Figure 3:
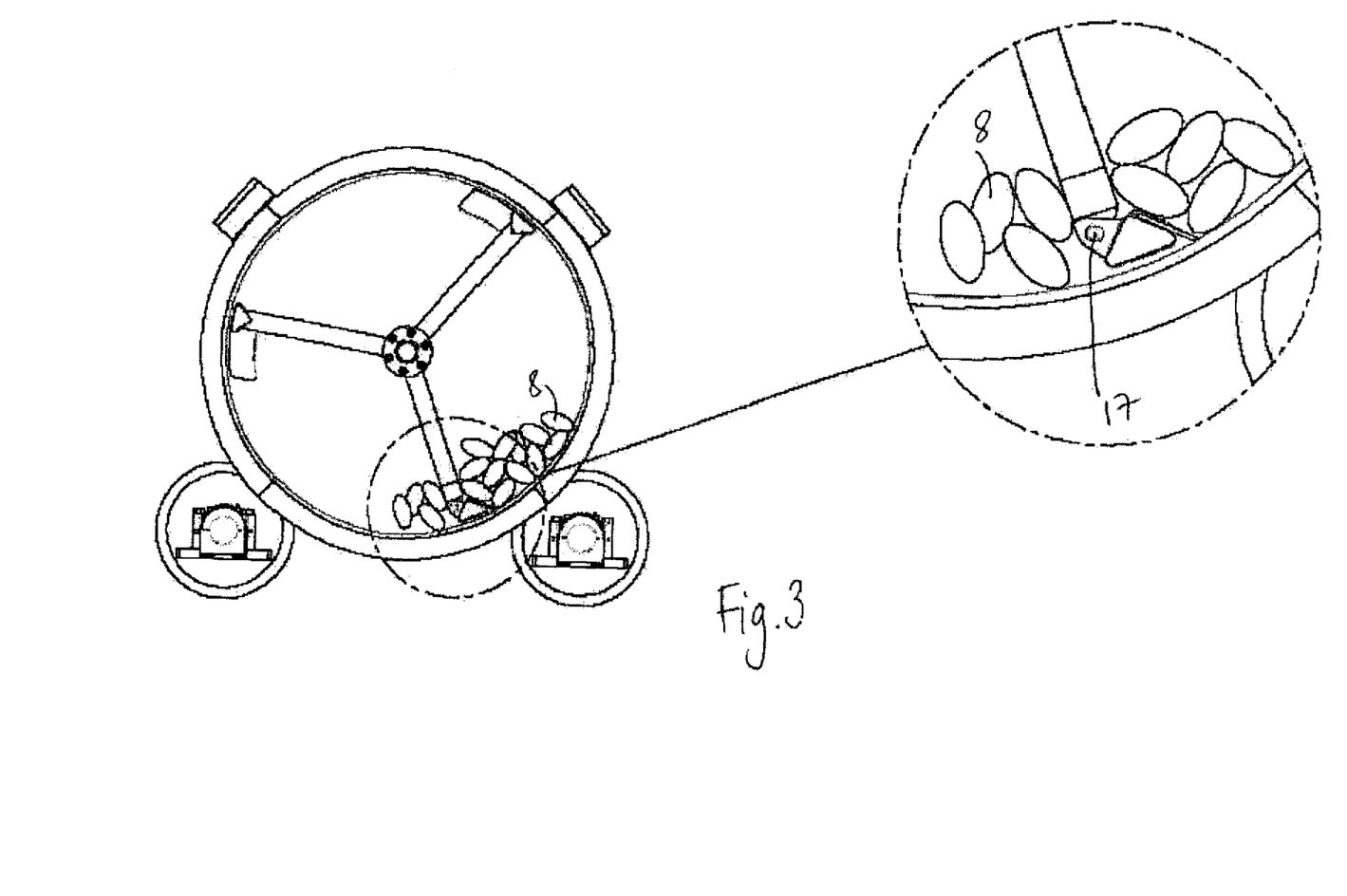
FIG. 3 shows the embodiment of FIG. 2 in use with produce within the drum.

FIG. 2 is a cross section view of a further embodiment of an apparatus according to the present invention. Three lifters 14 are provided in this embodiment. At least one 15 of the lifters is pivotally mounted on the end of its arm 13. The pivot 17 is loose so the lifter has freedom of movement. Attached to the leading edge 19 of the lifter 15 is a scraper 20, the end of which is in contact with the internal wall of the drum. In use, the scraper is urged into contact with the wall to push removed skin present on the internal surface of the drum through the perforations. As shown in FIG. 3, the produce 8 on the lifter applies a force to the scraper, the force having a component in the direction of the drum wall, to hold the scraper against the internal wall of the rotating drum. The scraper is preferably formed from a food-grade material and may have a resiliently flexible form.

Figure 4:
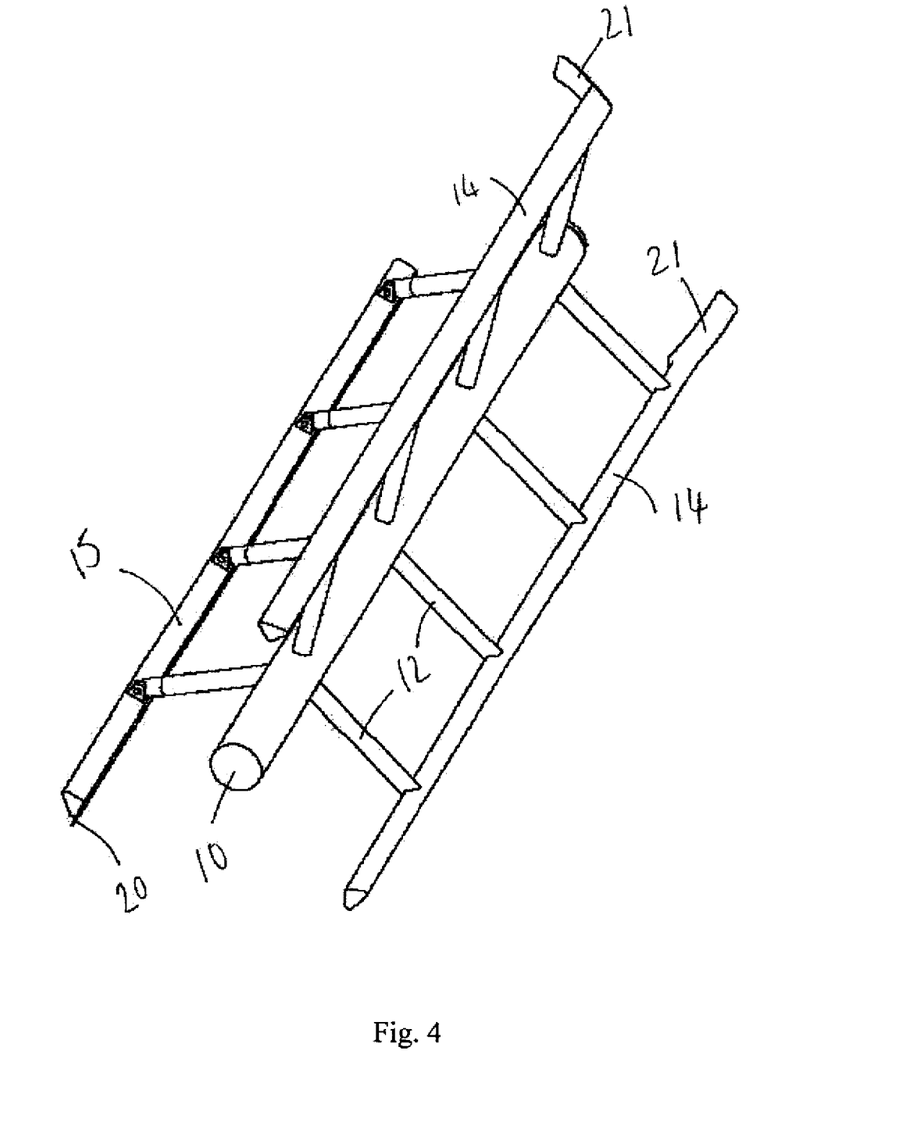
FIG. 4 shows a perspective view of the agitator from the drum of FIGS. 2 and 3.

FIG. 4 shows a perspective view of the agitator from the drum of FIGS. 2 and 3. Four sets of three arms 12 are provided although more or less sets may be used in alternative embodiments. The pivotally mounted lifter 15 is shown also. It is possible that one, some or all of the lifters are mounted in this manner, with our without a corresponding scraper 20.

A further optional feature shown in this drawing is a bend at the far end of the statically mounted lifters. This bent end portion 21 assists in pulling product in from the feeder end of the drum. One or more of the lifters may have this form.

Figure 5:
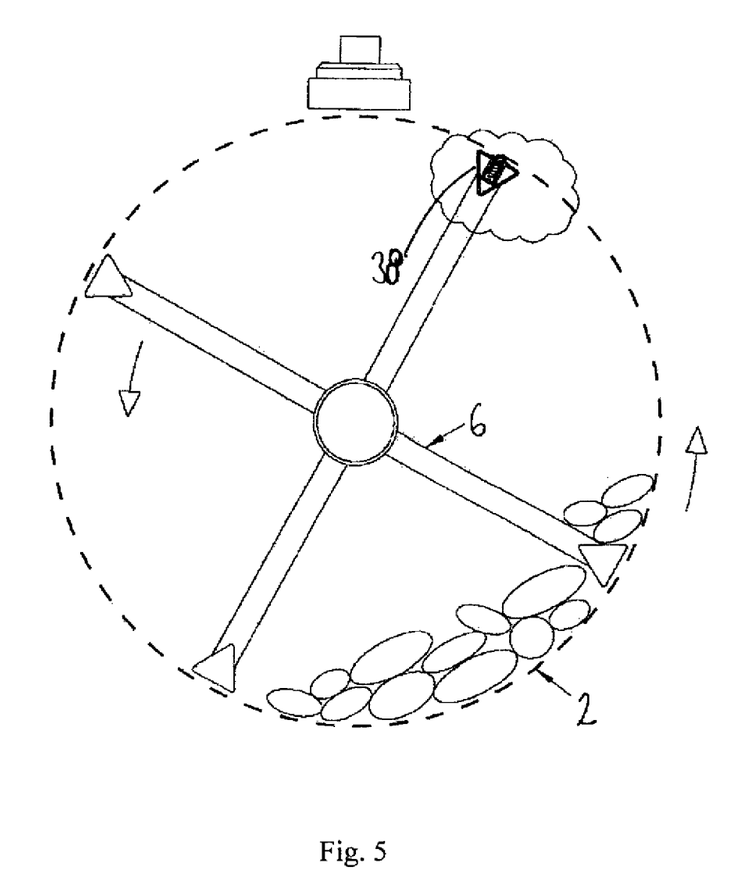
FIG. 5 is a cross section view of a further embodiment of an apparatus according to the present invention.

FIG. 5 shows a similar embodiment to that shown in FIG. 1. However in FIG. 5 at least one of the lifters 38 is provided with a spring mounted scraper. The scraper is spring-mounted and projects out from a cavity within the lifter 38. The spring biases the scraper against the wall of the drum to increase its scraping efficiency.

Figure 6:
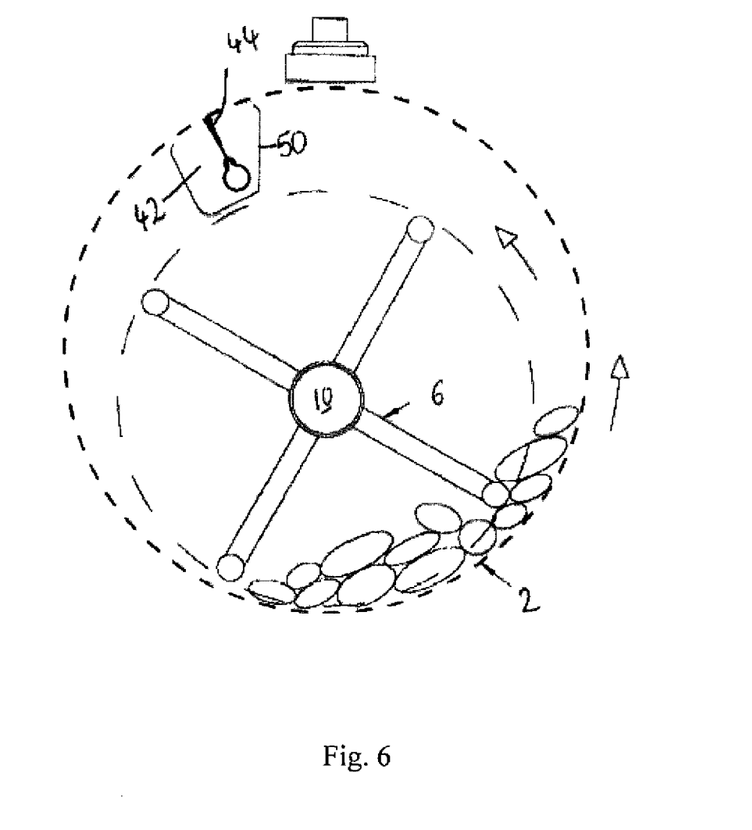
FIG. 6 is a cross section view of a further embodiment of an apparatus according to the present invention.

FIG. 6 shows another similar embodiment to that shown in FIG. 1. However in FIG. 6 the central axle of the agitator is off centre relative to the central axis of the drum. The agitator is smaller in size to accommodate a separate drum cleaning device 42 within the drum. The cleaning device incorporates a brush 44 which extends the length of the drum to clean the inner wall of the drum. The lifters in this embodiment only near an arc of the circumference of the drum in the region where product collects.

Figure 7:
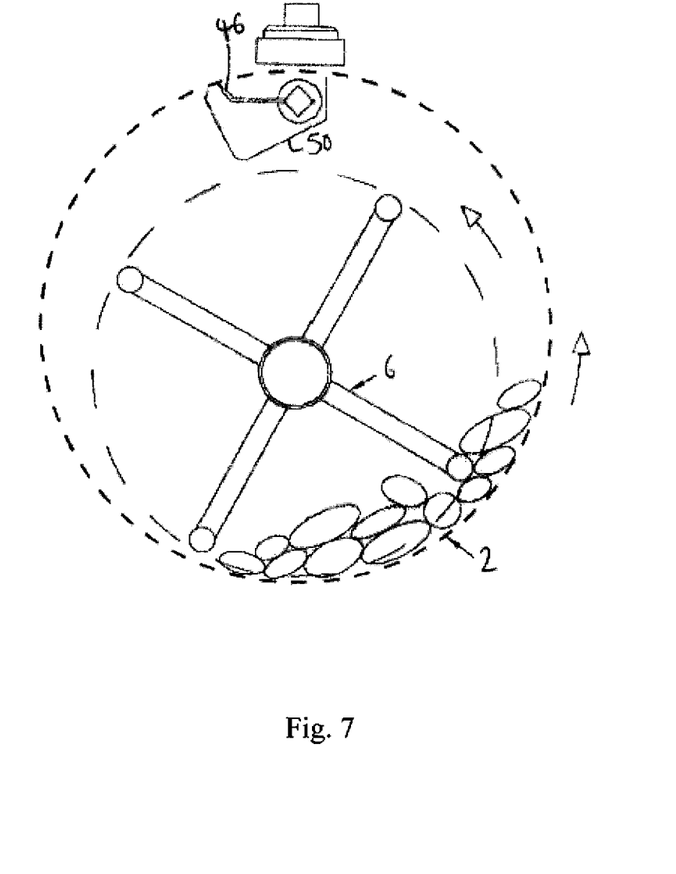
FIG. 7 is a cross section view of a further embodiment of an apparatus according to the present invention.

FIG. 7 shows a similar embodiment to that shown in FIG. 6. However in FIG. 7 a scraper 46 is provided in place of the drum cleaning device, shielded from the product and agitator by a housing 50.

Figure 8:
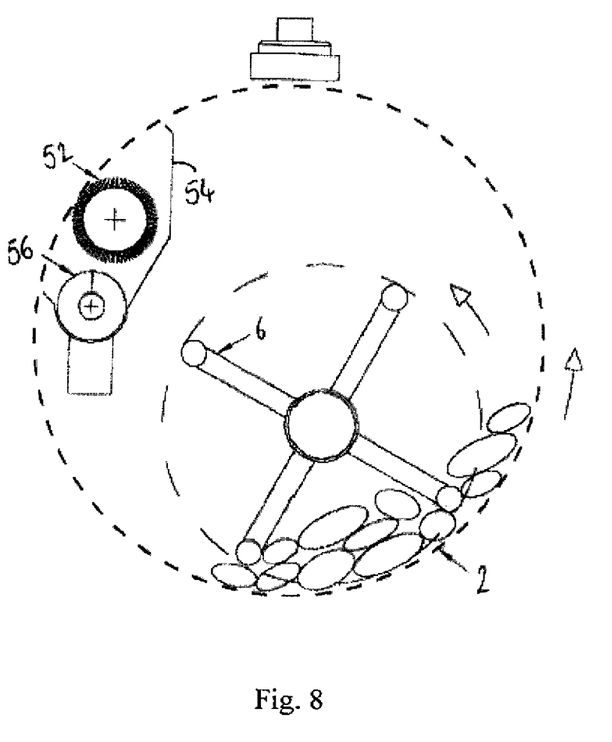
FIG. 8 an end view of an embodiment of an apparatus according to the present invention.

FIG. 8 shows another similar embodiment to that shown in FIG. 6. However in FIG. 8 a rotating brush 52 with circular cross section is provided extending the length of the drum. A housing 54 is provided, within which a waste/debris removal auger 56 is also found. The waste auger sits within a debris removal conduit (not shown) having an outlet external to said drum and acts in conjunction with the brush to clear away discharge removed from the drum wall by the brush.

Figure 9:
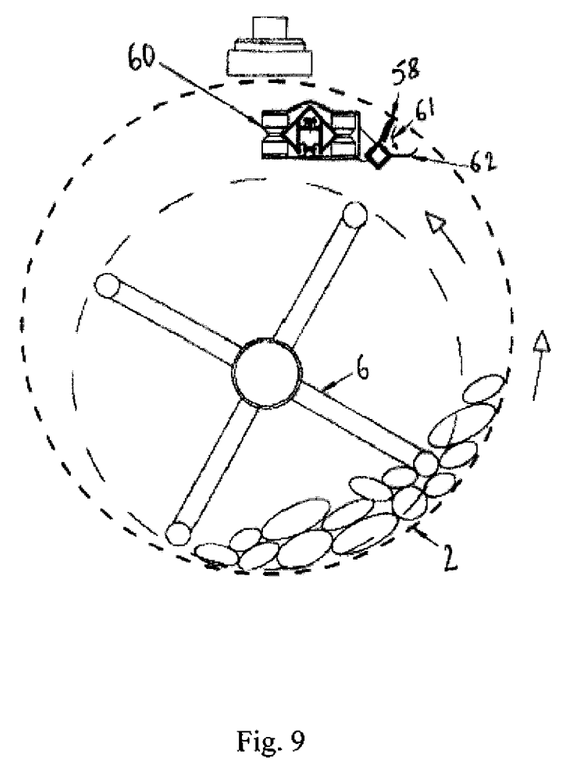
FIG. 9 is a cross section view of a further embodiment of an apparatus according to the present invention.

FIG. 9 shows a similar embodiment to that shown in FIG. 6, however in FIG. 9 the scraper 58 does not extend the length of the drum, instead it is carried along the length of the drum by a trolley 60 arranged to transverse the length of the drum. The scraper scraps peel and starch etc 61 onto a collection tray 62.

Figure 10:
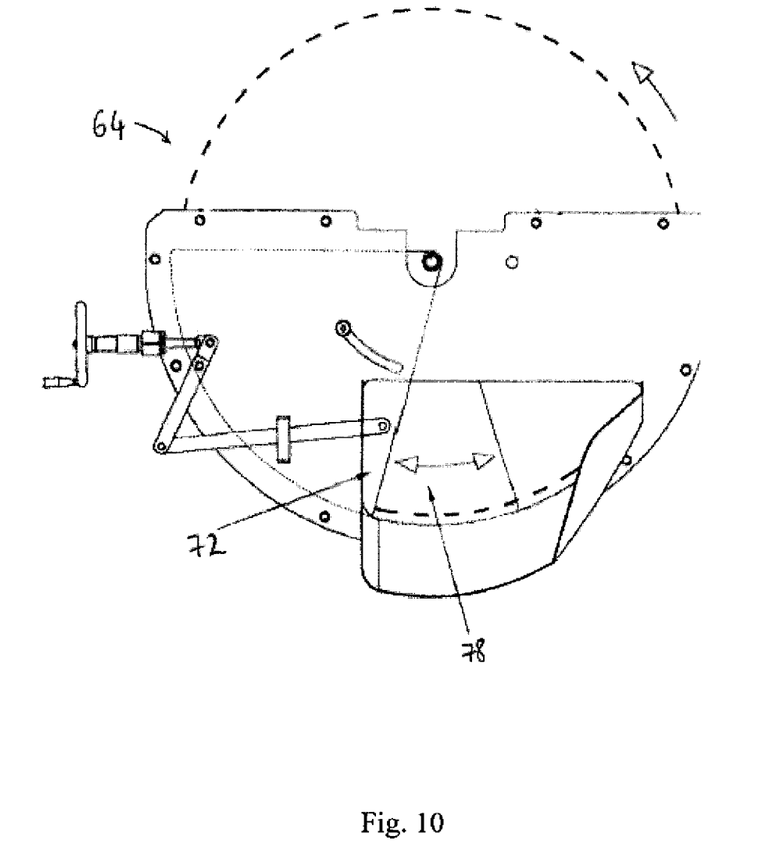
FIG. 10 is an end view of a drum in accordance with one embodiment of the invention.

FIG. 10 shows an arrangement 64 suitable for controlling product retention time. A pivotable gate 72 is moveable between a fully open position wherein the outlet of the drum is fully exposed and discharge of the product is not impeded and a fully closed position where the outlet is sealed. The extent of restriction of flow of product from the outlet 78 by the discharge gate can be varied, which in turn permits the depth of the product in the drum to be controlled and varied.

Figure 11:
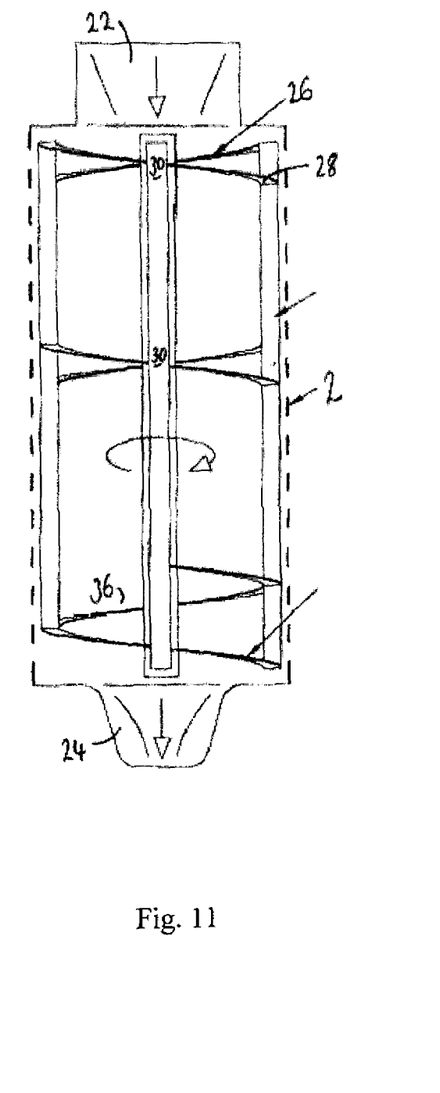
FIG. 11 is a cross section of a drum in accordance with a further embodiment of the invention.

FIG. 11 shows a cross section of a drum in accordance with a further embodiment of the invention. Between drum inlet 22 and an outlet 24, an augered agitator extends throughout the length of the drum comprising four lifters. The agitator arms 26 extend at an angle from the longitudinal axis of the central axle. The angle of extension of each arm of each set is skewed so the distal ends 28 of each arm of the set meet the lifter at different positions. There are sets of arms in this embodiment. The arms are flat like ribbons. Each of these two sets 30 form a segment of a ribbon auger to control the flow of product away from the inlet into the body of the drum. In the region of the outlet of the drum a further ribbon auger 36 is provided to control the rate of discharge.

In each embodiment the hollow frame form of the agitator means that an increase in rotation speed of the agitator does not result in a decrease in the retention time of the product with the drum. The produce is not driven substantially though the drum by the agitator. The main role of the agitator is to lift and drop the product. Separate means are provided to control the movement of product through the drum.

Figure 12:
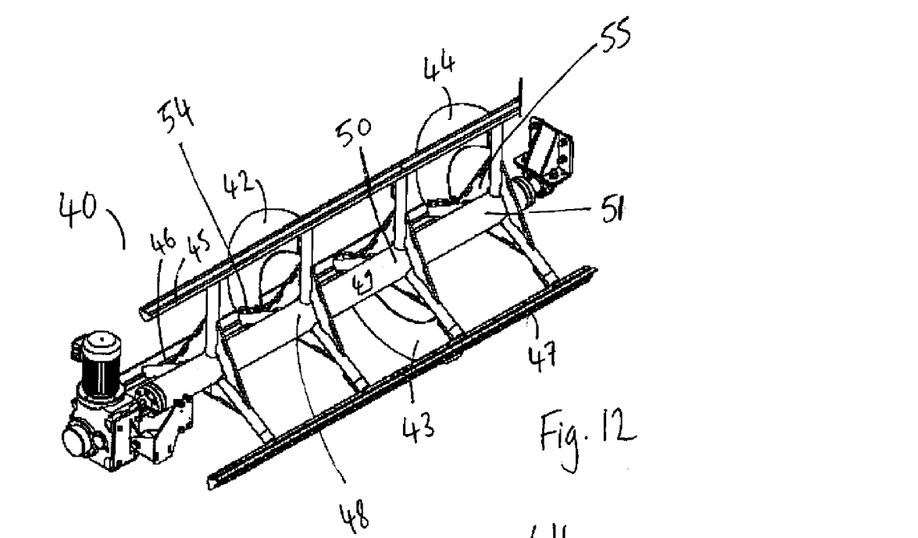
FIG. 12 is a perspective view of an agitator in accordance with one embodiment of the invention.
Figure 13:
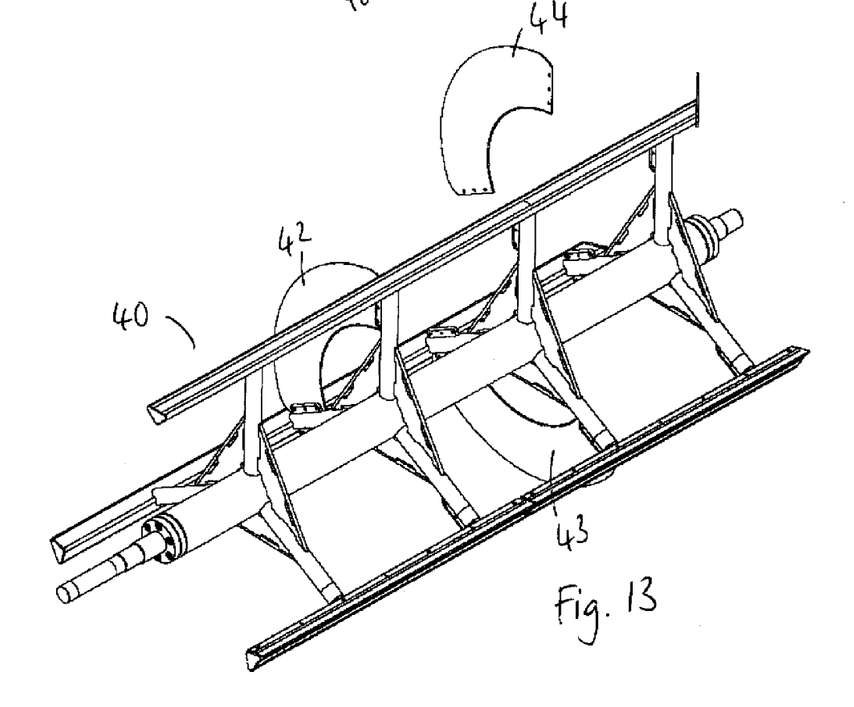
FIG. 13 is a perspective view of the agitator of FIG. 12, with one of its retarding plates detached.

FIGS. 12 and 13 show a further embodiment of agitator 40 in accordance with the present invention. The agitator in this embodiment shares a similar form to that shown in FIG. 4, however in this embodiment the agitator is provided with at least one plate 42, 43, 44 whose purpose it is to slow the movement of product through the drum. The plate acts therefore as a product retarder plate, interrupting the free passage of produce though the drum. The plate, or disc, acts to retain the product in the drum, in contrast to letting it pass directly through the drum. It may be desirable to retain the product within the drum to ensure sufficient time is given to fully peel the product. There may be one or multiple retarder plates/retainer discs incorporated within the agitator. In the example shown in FIG. 12, three plates 42, 43, 44 are provided, but any number may be used. As shown, two of the plates 42, 44 link the same pairs of lifters 45, 46, and are positioned on non-consecutive arms. Between these two plates is arranged a middle plate 43 linking an alternative pair of lifters 46, 47. As shown, the first plate 42 is located on the second set of arms coincidental with the second projection point 48 along the length of the central axle 49. The second plate 42 is located on the third set of arms coincidental with the third projection point 50 along the length of the central axle, while the third plate is located on the third set of arms coincidental with the fourth projection point 51 along the length of the central axle. However the plates may be provided on any of the arms. While both first and third plates is arranged between lifters 45 and 46, the second plate is arranged between lifters 46 and 47 in this embodiment. FIG. 13 shows the third plate 44 detached from the agitator.

Figure 14:
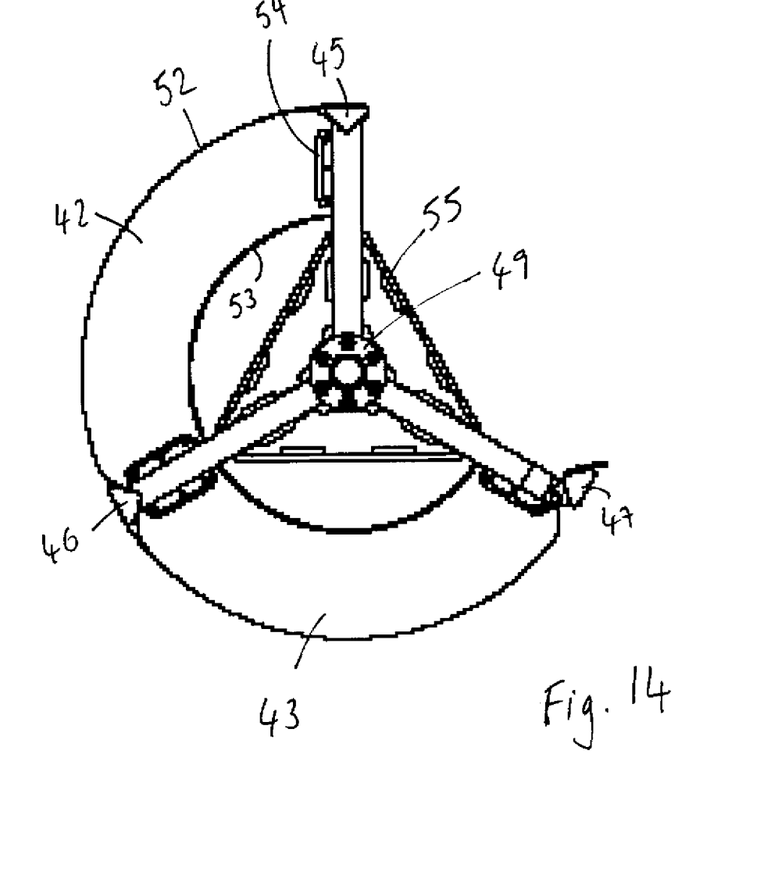
FIG. 14 is an end view of the agitator of FIGS. 12 and 13.

FIG. 14 shows an end view of the agitator of FIG. 12. Only the first plate 42 and the second plate 43 are visible in FIG. 12. As shown, lifters 45 and 47 have no retarder plate(s) between them. It will be appreciated that this is required to ensure that progression of the product through the drum is only slowed and not stopped completely. The plates therefore form a broken or segmented spiral along the length of the agitator.

In use, the retarder plates act to impart a stop-start progression to product through the drum. Product is momentarily held up by each plate until the plate rotates out of the way. If a plate is provided on the next set of arms, that next plate (and consecutive plates) will stall the progress of the product in the same manner. The plate may take any number of forms, as long as it stalls the progression of product. In this embodiment each plate has an arcuate form to link adjacent lifters whilst allowing the agitator to rotate freely in the drum. The shape of the outside edge 52 of the plate is complimentary to the shape of the internal wall of the drum to ensure maximum effectiveness of the plates in use. In this embodiment the inner edge 53 of each plate is also arcuate. As shown best in FIG. 14, each plate in this embodiment does not fully fill the space between the arms to which it is attached. The width of each plate is less than the length of the arms, permitting product to pass inside of the plate in the region of the central axis of the agitator. In alternative embodiments the plates may extend the full length of the arms to the central axle to fully block the region between the arms. In this embodiment, the plates are attached to the arms at a location distal to the central axle 49 to coincide with the outer region of the drum where most product will be located due to centrifugal forces as the drum rotated. The plates in FIGS. 12, 13 and 14 are attached by way of bracket 54, although any suitable attachment means is envisaged, or the plates and arms may be integral.

The agitator in FIGS. 12, 13 and 14 is further provided with brackets 55 between the arms at each arm projection point. The brackets purpose is to strengthen the arm/axle connection.

It will be appreciated that it is not essential that the brackets 55 and plates are provided together. The plates may be used on any agitator, with or without these brackets. Likewise, it is possible that any of the agitators described herein may be provided with one or more of these brackets, but without the plates.

It will be appreciated that this embodiment of agitator allows the movement of product through the drum to be controlled. The plates may be used in conjunction with, or as an alternative to, the gate shown in FIG. 10 to control product retention time.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention that are, for brevity, described in the context of a single embodiment, may also be provided separately or in any suitable sub-combination.

The invention claimed is:

1. An apparatus for product peel removal comprising:
a drum including an inlet for receiving product, an outlet for dispensing of product, and a plurality of perforations through which removed peel may pass;
at least one agitator arranged within said drum and rotatable relative to said drum for agitating the product passing between said inlet and outlet; and
a retention-time mechanism that controls a retention time of product within said drum independently from the rotation speed of the agitator,
wherein said at least one agitator comprises:
a central axle including at least one outwardly projecting arm; and
at least one lifter:
at the distal end of each outwardly projecting arm;
positioned parallel to the central axle; and
pivotally mounted on the respective outwardly projecting arm.

2. The apparatus of claim 1 wherein the drum is a rotatable drum.

3. The apparatus of claim 1, wherein said at least one agitator is rotatable independently from said drum.

4. The apparatus of claim 1, wherein an increase in rotation speed of said at least one agitator does not result in a decrease in the retention time of the product with the drum.

5. The apparatus of claim 4, wherein said at least one agitator includes a plurality of outwardly projecting arms.

6. The apparatus of claim 1, wherein said at least one lifter includes a scraper adapted to contact an internal wall of the drum.

7. The apparatus of claim 6, wherein the scraper is located on a leading edge of said at least one lifter.

8. The apparatus of claim 6, wherein the scraper is integral with said at least one lifter.

9. The apparatus of claim 6, wherein said at least one lifter is arranged so that, in use, the scraper is biased against the internal wall of the drum under the weight of product being lifted.

10. The apparatus of claim 1, further comprising a drum cleaner that removes peel from the interior wall of the drum.

11. The apparatus of claim 1, further comprising at least one scraper arranged to scrape the interior wall of the drum.

12. The apparatus of claim 1, further comprising a pushing mechanism that pushes removed peel through said perforations in the drum.

13. The apparatus of claim 12, wherein said pushing mechanism is located at the end of one of said at least one outwardly projecting arm.

14. The apparatus of claim 1, further comprising a first driving mechanism that rotates said at least one agitator.

15. The apparatus of claim 14, further comprising:
a second driving mechanism that rotates said drum;
wherein said first driving mechanism is controllable independently from said second driving mechanism.

16. The apparatus of claim 1, further comprising at least one product retarding plate to interrupt the progression of the product through the drum.

17. The apparatus of claim 16, further comprising multiple plates along the length of said at least one agitator.

18. The apparatus of claim 17, wherein:
said at least one agitator includes a plurality of lifters, and
each plate extends between a pair of lifters, among said plurality of lifters.

19. The apparatus of claim 17, wherein each plate is in a plane substantially perpendicular to the longitudinal axis of the drum.

20. The apparatus of claim 17, wherein:
said at least one agitator includes a plurality of outwardly projecting arms, and
the plates on adjacent outwardly projecting arms, among the plurality of outwardly projecting arms, are arranged to rotate out of synch with each other.

21. The apparatus of claim 1, wherein said plurality of outwardly projecting arms are a plurality of flat outwardly projecting arms each forming a segment of a ribbon auger for controlling flow of product through said drum.

22. The agitator of claim 21, wherein said plurality of outwardly projecting arms comprises at least one set of at least three outwardly projecting arms.

23. The agitator of claim 21, wherein:
said plurality of outwardly projecting arms comprises multiple sets of at least three outwardly projecting arms, and
at least three product lifters are each linked to an outwardly projecting arm from each set.

24. The agitator of claim 21, wherein each product lifter is positioned parallel to the central axle.

25. The agitator of claim 21, wherein each outwardly projecting arm extends substantially perpendicularly from the central axle.

26. The agitator of claim 21, further comprising at least one scraper mounted on at least one product lifter.

27. The agitator of claim 26, wherein said at least one scraper is located on a leading edge of said at least one product lifter.

28. The apparatus according to claim 1, further comprising
at least one product retarder plate mounted to said at least one outwardly projecting arm to stall progression of products through said drum.

29. The apparatus of claim 1, wherein the retention-time mechanism comprises a gate disposed at the outlet and movable between an open position and a closed position.

* * * * *